Oct. 5, 1965    T. J. FLANAGAN    3,209,968
BELT CLIP ATTACHMENT FOR CAMERA
Filed April 18, 1963    2 Sheets-Sheet 1
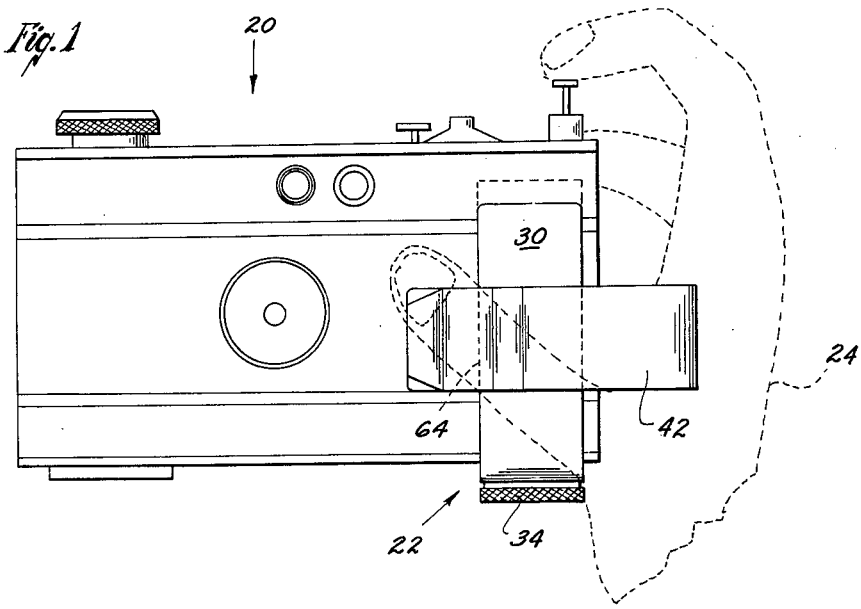
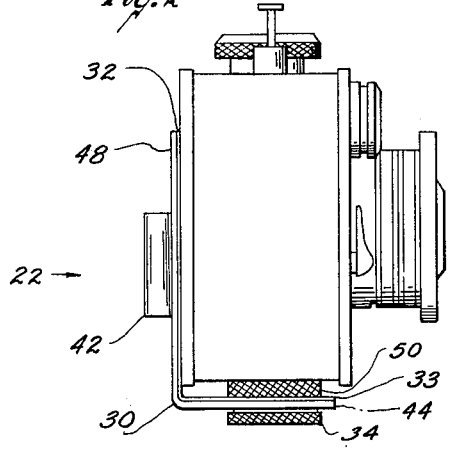
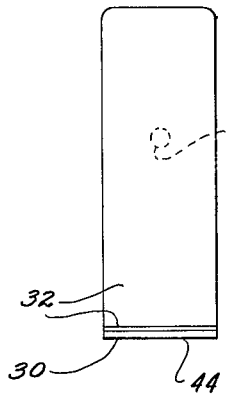
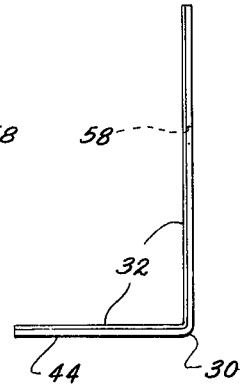
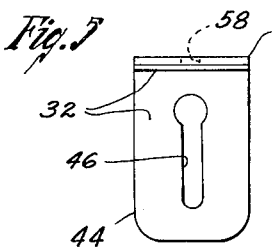
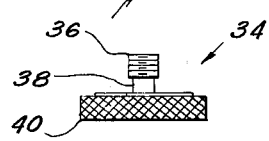
INVENTOR.
THOMAS J. FLANAGAN
BY
McCormick, Paulding & Huber
ATTORNEYS Oct. 5, 1965      T. J. FLANAGAN      3,209,968
BELT CLIP ATTACHMENT FOR CAMERA
Filed April 18, 1963      2 Sheets-Sheet 2
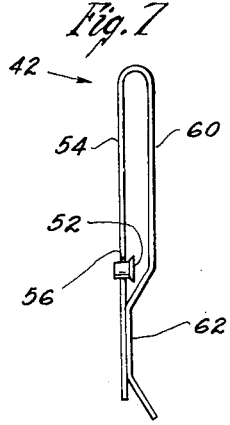
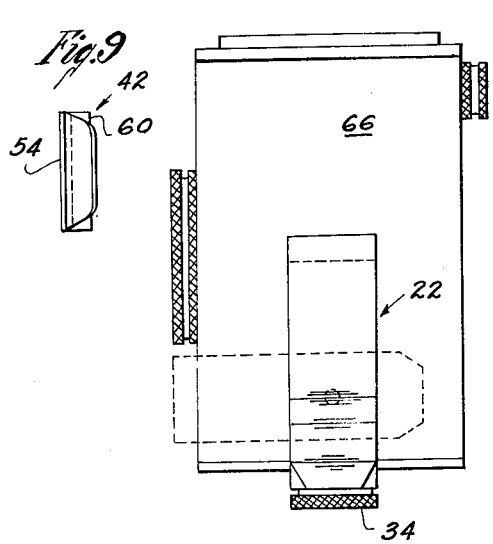
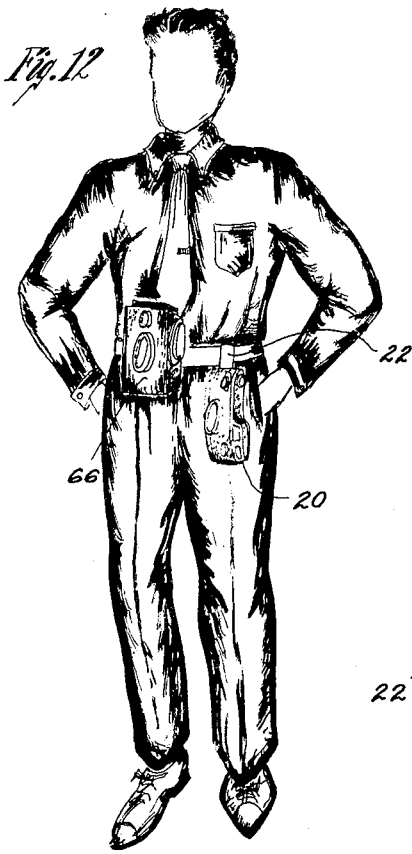
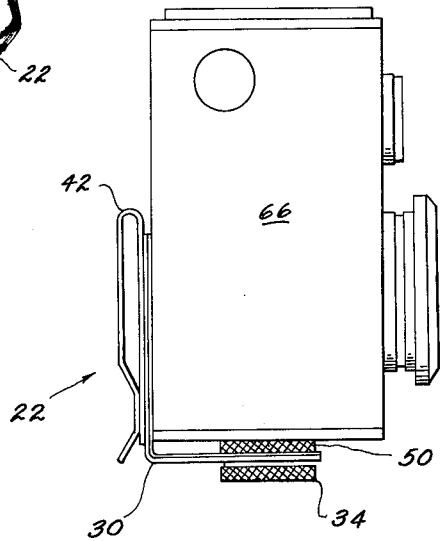

3,209,968
BELT CLIP ATTACHMENT FOR CAMERA
Thomas J. Flanagan, 21 Wood Pond Road,
Glastonbury, Conn.
Filed Apr. 18, 1963, Ser. No. 273,998
1 Claim. (Cl. 224—6)

The present invention relates to accessories for cameras and more particularly to an attachment which serves as both a belt clip and a steady rest or gripping means therefor.

The general object of the present invention is to provide an inexpensive accessory easily attached to any one of a variety of cameras, permitting the camera so equipped to be readily affixed to or removed from a belt or similar article whereat the camera is readily accessible for immediate use.

Another object is to provide a lightweight belt clip accessory adapted to being easily attached to a variety of cameras, which clip is so arranged on the camera case so as to provide a convenient steady rest or gripping means permitting one-hand operation of the camera.

The drawings show a preferred embodiment of the invention and such embodiment will be described, but it will be understood that various changes may be made from the construction disclosed, and that the drawings and description are not to be construed as limiting the scope of the invention, the claims forming a part of this specification being relied upon for that purpose.

Of the drawings:

FIG. 1 is a camera operator's view of a typical 35 mm. camera equipped with a device of the present invention, the hand of the operator being shown in broken lines.

FIG. 2 is a side view of the camera shown in FIG. 1.

FIG. 3 is a front view of a bracket of the present invention.

FIG. 4 is a side view of the FIG. 3 bracket.

FIG. 5 is a top view of the FIG. 3 bracket.

FIG. 6 is a side view of a thumbscrew of the present invention.

FIG. 7 is a side view of a clip of the present invention.

FIG. 8 is a front view of the FIG. 7 clip.

FIG. 9 is an end view of the FIG. 7 clip.

FIG. 10 is a rear view of another type of camera equipped with the device shown in FIG. 1.

FIG. 11 is a side view of the FIG. 10 camera.

FIG. 12 is a view showing both cameras clipped to the belt of a camera operator.

Turning now to FIGS. 1 and 2, a typical 35 mm. camera 20 is there shown equipped with a belt clip attachment 22 of the present invention. A camera operator's hand 24 is shown in broken lines as it would appear in using this device as a steady or gripping means during normal use of the camera. FIG. 12 shows the device 22 being used as a belt clip, the camera 20 equipped therewith being affixed to the camera operator's belt 26 where it is readily accessible for immediate use by him.

FIGS. 3 to 9 show in detail the various components of the device. In the order illustrated these are, an L-shaped bracket 30 with a mat 32 of frictional material cemented to the inner faces of both legs of the L as shown in FIGS. 3 to 5. A thumbscrew 34 with a threaded upper portion 36, a central portion 38 of reduced diameter, and a knurled head portion 40 are best shown in FIG. 6. A strip 42 of relatively thin flat resilient metal bent into the shape of a U and spring loaded to a normally closed position is shown in FIGS. 7 to 9.

More specifically, the bracket 30 has a lower leg 44 which defines an elongated opening 46 designed to accommodate the central portion 38 of the thumbscrew 34, and an upstanding leg 48 formed at roughly 90° to said lower leg so as to produce an L-shaped bracket 30. The aforementioned opening 46 has one end thereof, preferably the end closest to the upstanding leg 48 of the bracket, which is of slightly greater diameter than the width of the opening as best shown in FIG. 5. This diameter corresponds to that of the threaded upper portion 36 of the thumbscrew 34 permitting the latter to be inserted in the bracket opening prior to attaching the assembled device 22 to a camera. As shown in FIG. 2 the threaded portion 36 is received in a threaded tripod opening which may be defined by a nut 50 as shown, or by the camera case itself. One or the other form of tapped opening is to be found on the better classes of cameras. Such a tapped tripod opening is generally found on a camera at the lower right side as shown in FIGS. 1 and 2. As so constructed and arranged, the L-shaped bracket 30 is adapted to being adjustably attached to the camera 20 with the upstanding leg 32 engaging the case of the camera and the lower leg 44 engaging the tapped tripod nut 50. The aforementioned mat 32 is preferably constructed of frictional material so as to resist sliding movement between the bracket and the case of the camera, and also to resist any tendency of the thumbscrew to loosen in the tapped tripod nut 50.

Referring now to the U-shaped strip, or clip 42, a single rivet 52 serves to pivotally support the clip on the upstanding leg 48 of the bracket 30. This rivet is preferably of the countersunk variety and so arranged between the clip and the bracket as to permit 360° of rotation of the clip but at the same time to resist said motion, at least to some extent, whereby the clip is releasably retained in any selected angular position relative to the bracket, and to the camera case to which the latter is rigidly attached. As so constructed the clip 42 is well adapted to use as a steady rest and gripping means for the camera operator's hand 24, permitting one-hand operation of the camera as shown.

More specifically, this clip 42 is elongated in plan form having an inner leg 54 which is generally flat and adapted to lie adjacent the upstanding leg 48 of the L-shaped bracket, and having a hole 56 therein which when registered with a hole 58 of corresponding size in the bracket 30 is adapted to receive said rivet 52. In addition to this inner leg 54, an outer leg 60 of the U-shaped clip 42 is also provided, being generally flat throughout a portion of its length adjacent the closed end of said U-shaped clip 42, which legs, 54 and 60, are well adapted to accommodating the camera operator's belt 26 or the like therebetween. A generally offset portion 62 of said outer leg is also provided at the open end of the U-shaped clip 42. This offset portion 62 not only serves to close the clip around the camera operator's belt 26, as shown in FIG. 12, but it also serves as a guide for the camera operator's thumb 64 when the present device is being used as a steady rest and gripping means as shown in FIG. 1.

Finally, the versatility of a device of the present invention is illustrated in FIGS. 10, 11 and 12. As there shown other varieties of cameras, such as the reflex type 66, may be equipped with an identically constructed device 22 which is equally adapted to serving as a belt clip, as shown in FIG. 12, or as a steady rest and gripping means as shown by the broken lines in FIG. 10.

In conclusion, it might be pointed out that the device of the present invention, when used as a belt clip on any type of camera, results in a safer means for transporting the camera than the usual neck or shoulder strap normally supplied for this purpose. It will be apparent from FIG. 12 that the present invention obviates the need for these dangerous encumberances at no sacrifice in camera accessibility. Indeed, these cameras 20, 26 are rendered even more accessible as a result of the present invention than would be the case if they were equipped with the usual camera harnessing hardware.

The invention claimed is:

In an attachment for a camera having a tapped opening for connection with a tripod or the like, the combination comprising a generally L-shaped bracket, a lower leg of said bracket defining an elongated opening, a thumbscrew adapted to being threadably received in said tapped opening and also adapted to being slidably received in said elongated opening, an upstanding leg of said bracket arranged at approximately 90° to said lower leg and adjustable towards and away from the back of the camera case as result of said elongated opening, a U-shaped clip for engaging a camera operator's belt or similar article, said clip comprising a generally U-shaped strip having an elongated flat inner leg adapted to lie adjacent said upstanding leg of the L-shaped bracket, a single rivet connection between said inner leg and said upstanding leg for pivotally supporting said clip and releasably retaining said clip in a plurality of angular positions, an outer leg of said U-shaped strip being generally flat and parallel to the inner leg thereof along the portion of its length adjacent the closed end of said U-shaped strip to accommodate a belt or the like therebetween, said outer leg being offset adjacent the open end of the U-shaped strip to provide a guide for the camera operator's thumb when said clip is used as a steady rest and gripping means for the camera operator's hand during normal use of the camera.

References Cited by the Examiner

UNITED STATES PATENTS

| | | | |
|---|---|---|---|
| 1,318,850 | 10/19 | De Yong | 224—5.2 |
| 2,826,978 | 3/58 | Klaeden | 95—86 |

HUGO O. SCHULZ, *Primary Examiner.*

MORRIS TEMIN, *Examiner.*